United States Patent
Horak et al.

(10) Patent No.: US 10,477,120 B2
(45) Date of Patent: Nov. 12, 2019

(54) SYSTEM AND METHOD FOR ACQUIRING VISIBLE AND NEAR INFRARED IMAGES BY MEANS OF A SINGLE MATRIX SENSOR

(71) Applicant: THALES, Courbevoie (FR)

(72) Inventors: Raphaël Horak, Elancourt (FR); Yves Courcol, Elancourt (FR); Ludovic Perruchot, Elancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/779,050

(22) PCT Filed: Dec. 7, 2016

(86) PCT No.: PCT/EP2016/080139
§ 371 (c)(1),
(2) Date: May 24, 2018

(87) PCT Pub. No.: WO2017/097857
PCT Pub. Date: Jun. 15, 2017

(65) Prior Publication Data
US 2018/0359432 A1   Dec. 13, 2018

(30) Foreign Application Priority Data
Dec. 11, 2015 (FR) ...................... 15 02572

(51) Int. Cl.
*H04N 5/33* (2006.01)
*H04N 9/04* (2006.01)
(Continued)

(52) U.S. Cl.
CPC ............. *H04N 5/332* (2013.01); *H04N 9/045* (2013.01); *H04N 9/646* (2013.01); *H04N 9/67* (2013.01); *H04N 2209/046* (2013.01)

(58) Field of Classification Search
CPC .......... H04N 5/332; H04N 9/67; H04N 9/646; H04N 5/33; H04N 9/045; H04N 2209/046
(Continued)

(56) References Cited

U.S. PATENT DOCUMENTS 4,642,678 A   2/1987   Cok
8,619,143 B2  12/2013  Motta
(Continued)

FOREIGN PATENT DOCUMENTS

WO   2014/170359 A1   10/2014

OTHER PUBLICATIONS

D. Hertel et al., "A low-cost VIS-NIR true color night vision video system based on a wide dynamic range CMOS imager," IEEE 2009, pp. 273-278.
(Continued)

*Primary Examiner* — Helen Shibru
(74) *Attorney, Agent, or Firm* — Baker & Hostetler LLP

(57) ABSTRACT

A system for acquiring images in color and near-infrared, comprising: a matrix sensor, which comprises first, second, and third types of pixels sensitive to respective visible colors and a fourth type of panchromatic pixels sensitive in the near-infrared; and a signal processing circuit configured to reconstruct first and second sets of monochromatic images, a panchromatic image, a color image from the images of the first set and from the panchromatic image, and at least one image in the near-infrared from the images of the second set and from the panchromatic image. A visible-near-infrared bispectral camera comprises such an acquisition system and method implemented by means of such a camera.

16 Claims, 13 Drawing Sheets

(51) Int. Cl.
*H04N 9/64* (2006.01)
*H04N 9/67* (2006.01)

(58) Field of Classification Search
USPC .......................................................... 348/164
See application file for complete search history.

(56) References Cited

U.S. PATENT DOCUMENTS

| | | | | |
|---|---|---|---|---|
| 2006/0088298 A1* | 4/2006 | Frame | ................... | H04N 5/332 386/227 |
| 2009/0147112 A1* | 6/2009 | Baldwin | ................ | G03B 17/00 348/273 |
| 2009/0285476 A1 | 11/2009 | Choe et al. | | |
| 2014/0320602 A1* | 10/2014 | Govindarao | ........... | H04N 9/045 348/46 |
| 2015/0163418 A1 | 6/2015 | Chen et al. | | |
| 2017/0287667 A1* | 10/2017 | Letexier | .................. | H01J 31/56 |

OTHER PUBLICATIONS

D. Kiku et al., "Simultaneously Capturing of RGB and Additional Band Images using Hybrid Color Filter Array," Proc. of SPIE-IS&T Electronic Imaging, SPIE vol. 9023, 2014.

Yue M. Lu et al., "Designing Color Filter Arrays for the Joint Capture of Visible and Near-Infrared images," 16th IEEE Conference on Image Processing, 2009, pp. 3797-3800.

Z. Sadeghipoor et al., "Correlation-Based Joint Acquisition and Demosaicing of Visible and Near-Infrared Images," 18th IEEE Conference on Image Processing, 2011.

Z. Sadeghipoor et al., "A Novel Compressive Sensing Approach to Simultaneously Acquire Color and Near Infrared Images on a Single Sensor," Proc. IEEE International Conference on Acoustics, Speech and Signal Processing (ICASSP), Vancouver, Canada, 2013.

* cited by examiner

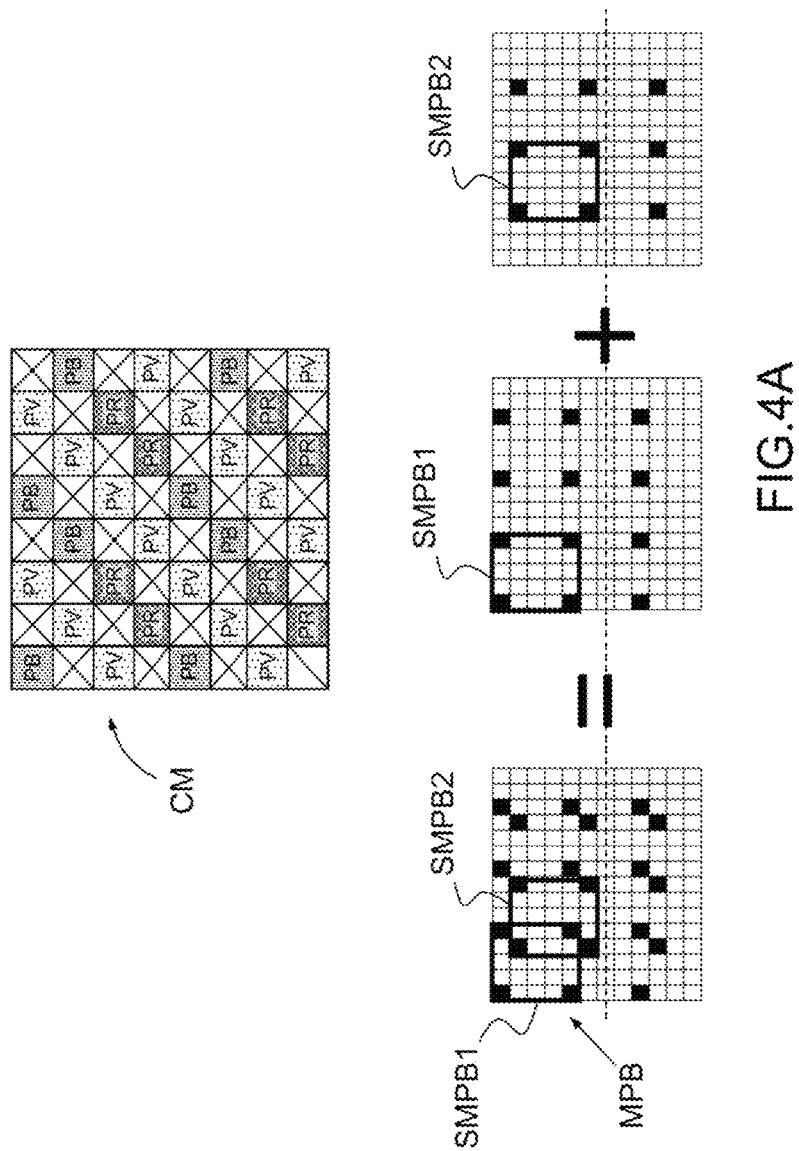

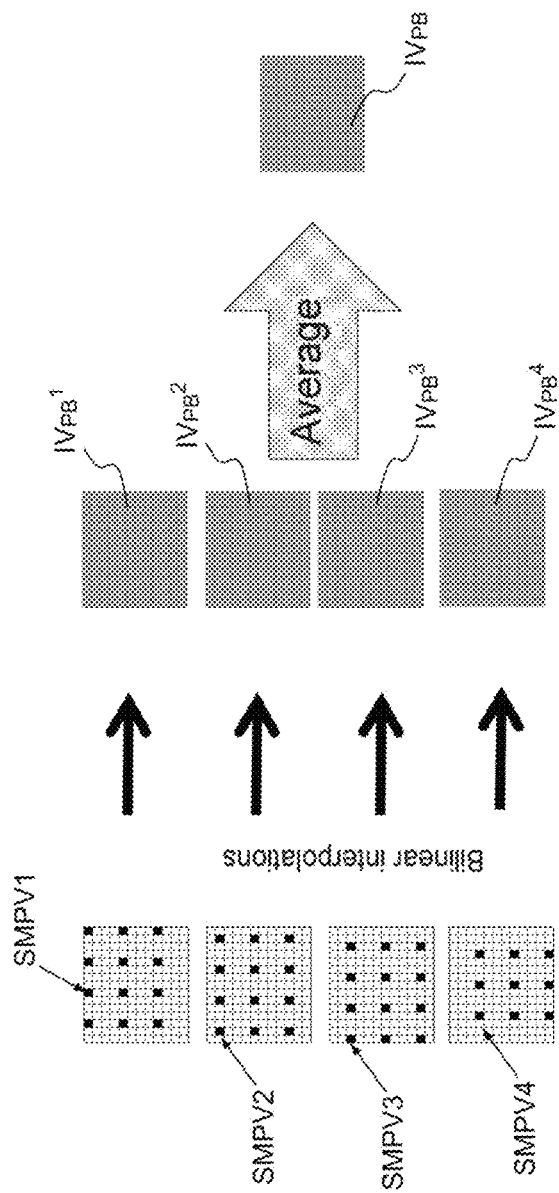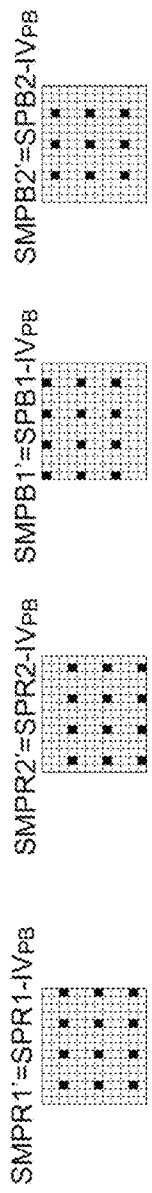
FIG.4B
FIG.4C

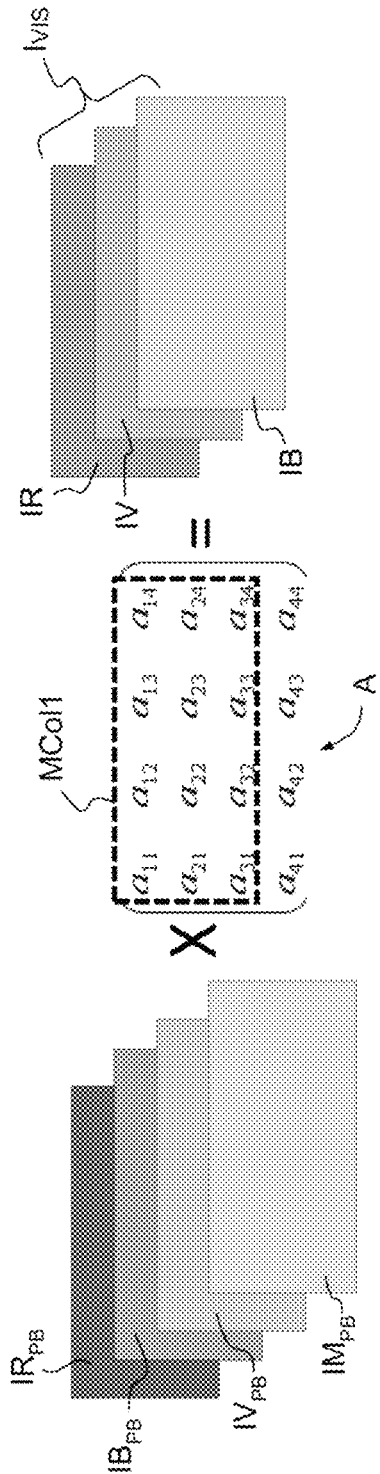
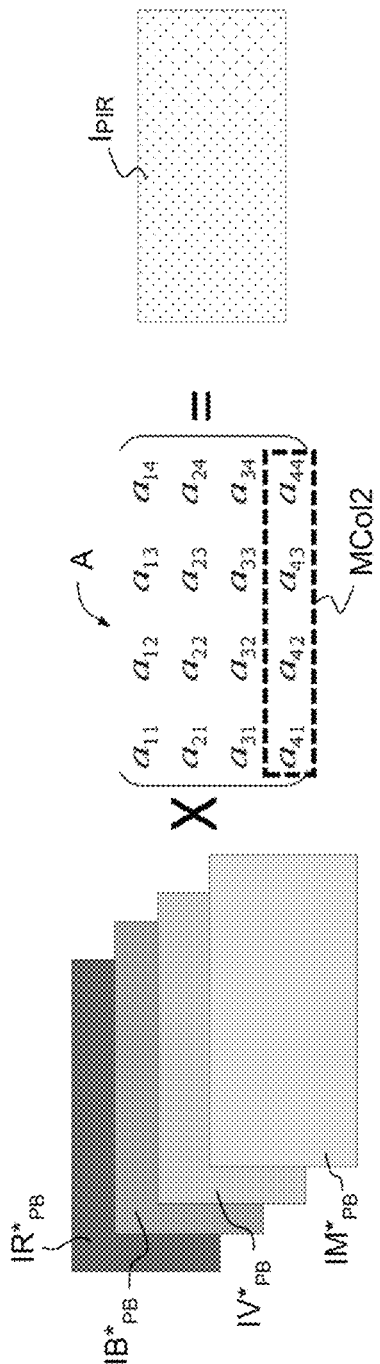
FIG.6A
FIG.6B

SYSTEM AND METHOD FOR ACQUIRING VISIBLE AND NEAR INFRARED IMAGES BY MEANS OF A SINGLE MATRIX SENSOR

CROSS-REFERENCE TO RELATED APPLICATIONS

This application is a National Stage of International patent application PCT/EP2016/080139, filed on Dec. 7, 2016, which claims priority to foreign French patent application No. FR 1502572, filed on Dec. 11, 2015, the disclosures of which are incorporated by reference in their entirety.

FIELD OF THE INVENTION

The invention relates to a system for acquiring visible and near-infrared images, on a visible—near-infrared bispectral camera comprising such a system and to a method for simultaneous acquisition of images in colors and in the near-infrared by use of such a camera.

BACKGROUND

The "near-infrared" (or "NIR", the acronym for "Near InfraRed") corresponds to the 700-1100 nm spectral band, whereas the visible light extends between 350 and 700 nm. It is sometimes considered that the near-infrared starts at 800 nm, the intermediate 700-800 nm band being eliminated using an optical filter.

The invention can be applied equally to the defense and security sectors (for example night vision) and in consumer electronics.

Conventionally, images in visible light (hereinafter called "visible images" for conciseness), generally in colors, and images in the near-infrared, are acquired independently by means of two distinct matrix sensors. In order to reduce the bulk, these two sensors can be associated with a single image-forming optical system via a dichroic beam splitter, so as to form a bi-spectral camera.

Such a configuration presents a certain number of drawbacks. Firstly, the use of two independent sensors and of a beam splitter increases the costs, the bulk, the electrical consumption and the weight of a bi-spectral camera, which is above all problematic in embedded applications, for example airborne. Furthermore, the optical system has to be specially adapted for this application, which limits the possibilities of using commercial off-the-shelf optics, even further increasing the costs.

It has also been proposed, mainly in academic-type works, to use a single matrix sensor for the acquisition of the visible and near-infrared images. Indeed, the silicon sensors commonly used in the digital cameras exhibit a sensitivity which extends from the visible to the near-infrared; this means that the cameras intended to operate only in the visible are equipped with an optical filter intended to avoid a pollution of the image by the infrared components.

The documents:
D. Kiku et al. "Simultaneously Capturing of RGB and Additional Band Images using Hybrid Color Filter Array", Proc. of SPIE-IS&T Electronic Imaging, SPIE Vol. 9023 (2014); and
U.S. Pat. No. 8,619,143 describe matrix sensors comprising pixels of four different types: pixels sensitive to blue light, to green light and to red light as in the conventional "RVB" sensors, but also "grey" pixels, sensitive only to the NIR radiation. Conventionally, these different types of pixels are obtained by the deposition of absorbent filters, forming a matrix of color filters, on elementary silicon sensors which are, by themselves, "panchromatic", that is to say sensitive to all the visible and near-infrared band. Generally, the pigments used to produce these filters are transparent in the near-infrared; the images acquired by the "red", "green" and "blue" pixels are therefore affected by the infrared component of the incident light (because the optical filter used in the conventional cameras is, obviously, absent) and a digital processing is necessary to recover colors close to reality.

The documents:
Z. Sadeghipoor et al. "Designing Color Filter Arrays for the Joint Capture of Visible and Near-Infrared images", 16th IEEE Conference on Image Processing (2009);
Z. Sadeghipoor et al. "Correlation-Based Joint Acquisition and Demosaicing of Visible and Near-Infrared Images", $18^{th}$ IEEE Conference on Image Processing (2011)

describe sensors having a more complex matrix of color filters, intended to optimize the reconstruction of the visible and infrared images.

Conversely, the document
Z. Sadeghipoor et al. "A Novel Compressive Sensing Approach to Simultaneously Acquire Color and Near Infrared Images on a Single Sensor" Proc. IEEE International Conference on Acoustics, Speech and Signal Processing (ICASSP), Vancouver, Canada (2013)

describes a sensor having matrix of color filters is close to, but slightly different from, the so-called "Bayer" matrix, which is the one most commonly used in color cameras. A conventional Bayer matrix would not make it possible to separate the visible and infrared components.

These approaches use sensors in which all the pixels are equipped with a special filter. Now, in order to produce cameras with high sensitivity, it is advantageous to use sensors also comprising panchromatic pixels, without filters. In some cases, even so-called "sparse" sensors are used, comprising a high percentage of panchromatic pixels in order to pick up most of the incident radiation. These sensors exploit the fact that the chrominance of an image can be undersampled relative to its luminance without an observer perceiving a significant degradation of its quality.

The document:
D. Hertel et al. "A low-cost VIS-NIR true color night vision video system based on a wide dynamic range CMOS imager", IEEE Intelligent Vehicles Symposium, 2009, pages 273-278;

describes the use of a sensor comprising colored pixels and panchromatic pixels for the simultaneous acquisition of visible and near-infrared images. The method for constructing PIR images is not explained and no example of such images is shown; only "full-band" monochromatic images, that can be exploited in low-light conditions, are shown. Moreover, this article relates only to the case of an "RGBM" sensor which contains only 25% panchromatic pixels, which greatly limits the sensitivity gain that can be achieved.

SUMMARY OF THE INVENTION

The invention aims to overcome the abovementioned drawbacks of the prior art. More specifically, it aims to obtain a system for simultaneous acquisition of visible and NIR images exhibiting a great sensitivity and making it possible to obtain images of high quality. Preferably, the invention allows for the use of "commercial off-the-shelf" (COTS) matrix sensors and optical systems.

In accordance with the invention, a high sensitivity is obtained through the use of sensors comprising both colored pixels (including or not including "grey" pixels sensitive to the NIR) and a fairly high number of panchromatic pixels (preferably more than a quarter of the pixels), and preferably sparse sensors; the high image quality is obtained by the implementation of an innovative digital processing. More specifically, this processing comprises the reconstruction of a panchromatic image and of two color "intermediate" visible images. These two intermediate visible images are obtained by means of two different processing operations: one, that can be qualified as "intra-channel", uses only the signals from the colored pixels, whereas the other, that can be qualified as "inter-channel", also uses the panchromatic image. The NIR image is obtained from the "inter-channel" color image and from the panchromatic image, whereas the color image is obtained by combining the "intra-channel" intermediate image with the panchromatic image.

A subject of the invention is therefore an image acquisition system comprising: a matrix sensor comprising a two-dimensional arrangement of pixels, each pixel being adapted to generate an electrical signal representative of the light intensity at a point of an optical image of a scene; and a signal processing circuit configured to process the electrical signals generated by said pixels so as to generate digital images of said scene; wherein said matrix sensor comprises a two-dimensional arrangement: of so-called colored pixels, of at least one first type, sensitive to visible light in a first spectral band; a second type, sensitive to visible light in a second spectral band different from the first; and a third type, sensitive to visible light in a third spectral band different from the first and the second, a combination of the spectral bands of the different types of colored pixels reconstituting all of the visible spectrum; and of so-called panchromatic pixels, sensitive to all the visible spectrum, at least the panchromatic pixels being also sensitive to the near-infrared; characterized in that said signal processing circuit is configured to: reconstruct a first set of monochromatic images from the electrical signals generated by the colored pixels; reconstruct a panchromatic image from the electrical signals generated by the panchromatic pixels; reconstruct a second set of monochromatic images from the electrical signals generated by the colored pixels, and from said panchromatic image; reconstruct a color image by application of a first colorimetry matrix to the monochromatic images of the first set and to said panchromatic image; reconstruct at least one image in the near-infrared by application of a second colorimetry matrix at least to the monochromatic images of the second set and to said panchromatic image; and supply as output said color image and said or at least one said image in the near-infrared.

Preferably, the images of the first set are obtained only from the electrical signals generated by the colored pixels, without a contribution from the electrical signals generated by the panchromatic pixels. Furthermore, the first colorimetry matrix will preferably be such that the color image produced as output is substantially free of contributions originating from an infrared component of the optical image, whereas the images of the second set will generally include such contributions.

According to particular embodiments of the invention:
Said colored pixels can comprise only the pixels of said first, second and third types, which are also sensitive to the near-infrared. More particularly, the pixels of one out of the first, the second and the third types can be sensitive to green light, those of another out of the first, the second and the third types can be sensitive to blue light and those of the remaining type out of the first, the second and the third types can be sensitive to red light.

Said matrix sensor can be of sparse type, more than a quarter and preferably at least half of its pixels being panchromatic.

Said signal processing circuit can be configured to reconstruct the monochromatic images of said first set by application of a method comprising the following steps: determining the light intensity associated with each pixel of said first type and reconstructing a first monochromatic image from said first set by interpolation of said light intensities; determining the light intensity associated with each colored pixel of the other types, and subtracting therefrom a value representative of the intensity associated with a corresponding pixel of said first monochromatic image; reconstructing new monochromatic images by interpolation of the light intensity values of the respective colored pixels of said other types, from which have been subtracted said values representative of the intensity associated with a corresponding pixel of said first monochromatic image, then combining these new reconstructed images with said first monochromatic image to obtain respective final monochromatic images of said first set.

Said signal processing circuit can be configured to reconstruct said panchromatic image by interpolation of the electrical signals generated by the panchromatic pixels.

Said signal processing circuit can be configured to reconstruct the monochromatic images of said second set by computing the luminance level of each pixel of each said image by application of a linear function, defined locally, to the luminance of the corresponding pixel in the panchromatic image.

As a variant, said signal processing circuit can be configured to reconstruct the monochromatic images of said second set by computing the luminance level of each pixel of each said image by means of a non-linear function of the luminance levels of a plurality of pixels of the panchromatic image in a neighborhood of the pixel of said panchromatic image corresponding to said pixel of said image of the second set and/or of the light intensity of a plurality of colored pixels.

Said matrix sensor can be composed of a periodic repetition of blocks containing pseudo-random distributions of pixels of the different types and wherein said signal processing circuit is configured to: extract regular patterns of pixels of the same types from said matrix sensor; and reconstruct said first and second sets of monochromatic images by parallel processing of said regular patterns of pixels of the same types.

Said signal processing circuit can also be configured to reconstruct a monochromatic image with low brightness level by application of a third colorimetry matrix at least to the monochromatic images of the second set and to said panchromatic image.

Said matrix sensor can also comprise a two-dimensional arrangement of pixels only sensitive to the near-infrared, and wherein said signal processing circuit is configured to reconstruct said image in the near-infrared also from the electrical signals generated by these pixels.

The system can also comprise an actuator for producing a relative periodic displacement between the matrix sensor and the optical image, the matrix sensor being adapted to reconstruct said first and second sets of monochromatic images and said panchromatic image from electrical signals generated by the pixels of the matrix sensor corresponding to a plurality of distinct relative positions of the matrix sensor and of the optical image.

Said signal processing circuit can be produced from a programmable logic circuit.

Another object of the invention is a visible—near-infrared bispectral camera comprising such an image acquisition system and an optical system adapted to form an optical image of a scene on a matrix sensor of the image acquisition system, without filtering of the near-infrared.

Yet another object of the invention is a method for simultaneous acquisition of images in color and in the near-infrared by use of such a bispectral camera.

BRIEF DESCRIPTION OF THE DRAWINGS

Other features, details and advantages of the invention will emerge on reading the description given with reference to the attached drawings given by way of example and which represent, respectively:

FIGS. 3A to 6C, diagrams illustrating different steps of the processing of FIG. 2;

DETAILED DESCRIPTION

Figure 1A:
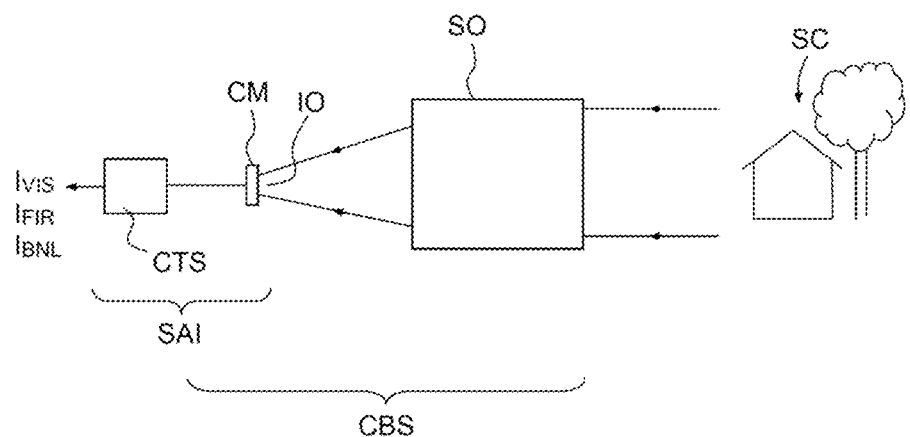
FIG. 1A, a functional diagram of a camera according to an embodiment of the invention.

FIG. 1A shows the functional diagram, highly simplified, of a visible, near-infrared bispectral camera CBS according to an embodiment of the invention. The camera CBS comprises an optical system SO, generally based on lenses, which forms an optical image IO of an observed scene SO. The image IO is formed on the surface of a matrix sensor CM, comprising a two-dimensional arrangement of pixels; each pixel produces an electrical signal representative of the light intensity of the corresponding dot (in fact, of a small region) of the optical image, weighted by its spectral sensitivity curve. These electrical signals, generally after having been converted into digital format, are processed by a processing circuit CTS which supplies digital images at its output: a first image in colors (composed of three monochromatic images of different colors) $I_{VIS}$ and a second image, monochromatic, in the near-infrared. Optionally, the processing circuit CTS can supply as output also a visible monochromatic image $I_{BNL}$, useful in particular when the observed scene exhibits a low brightness level. The matrix sensor CM and the processing circuit CTS constitute that which will hereinafter be called an image acquisition system. The circuit CTS can be a microprocessor, preferably specialized for digital signal processing (DSP, "Digital Signal Processor") programmed appropriately, or else a dedicated digital circuit, produced for example from a programmable logic circuit such as an FPGA; it can however also be an Application Specific Integrated Circuit (ASIC).

Figure 1B:
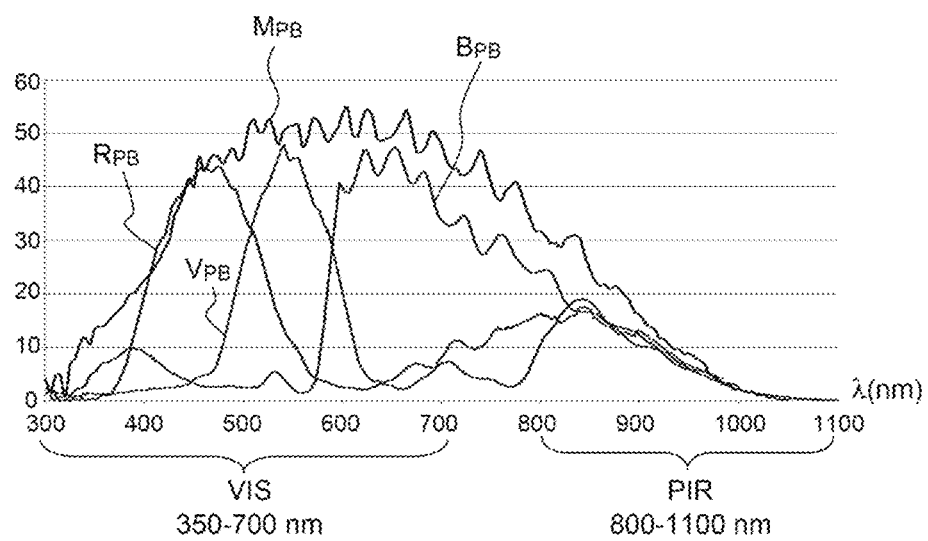
FIG. 1B, graphs illustrating the spectral response of the pixels of the matrix sensor of the camera of FIG. 1A.

The matrix sensor can be of CCD or CMOS type; in the latter case, it can incorporate an analog-digital converter so as to directly supply digital signals at its output. In any case, it comprises at least four different types of pixels: three first types sensitive to spectral bands corresponding to colors which, mixed, reproduce the white of the visible spectral band (typically red, green and blue) and a "panchromatic" fourth type. In a preferred embodiment, all these types of pixels also exhibit a non-zero sensitivity in the near-infrared—which is the case of the silicon sensors. This sensitivity in the near-infrared is generally considered as a nuisance, and eliminated using an optical filter, but is exploited by the invention. Advantageously, the pixels all have the same structure, and differ only by a filtering coating on their surface (absent in the case of the panchromatic pixels), generally polymer-based. FIG. 1B shows the sensitivity curves of the red ($R_{PB}$), green ($V_{PB}$), blue ($B_{PB}$) and panchromatic ($M_{PB}$) pixels. It will be noted that the sensitivity in the near-infrared is substantially the same for all four types of pixels. The index "PB" means "full band", to indicate that the infrared component of the incident radiation has not been filtered.

As will be explained in more detail later, referring to FIG. 8, the sensor can also comprise pixels of a fifth type, sensitive only to the near-infrared.

The figure identifies the visible (350-700 nm) VIS and near-infrared (800-1100) PIR spectral bands. The intermediate band (700-800 nm) can be filtered, but that is not advantageous in the case of the invention; more usefully, it can be considered as near-infrared.

Advantageously, the matrix sensor CM can also be "sparse", which means that the panchromatic pixels are at least as numerous as, and preferably more numerous than, those of each of the three colors. Advantageously, at least half of the pixels are panchromatic. That makes it possible to enhance the sensitivity of the sensor because the panchromatic pixels, not including any filter, receive more light than the colored pixels.

The arrangement of the pixels can be pseudo-random, but is preferably regular (that is to say periodic according to the two spatial dimensions) in order to facilitate the image processing operations. It can notably be a periodicity on a random pattern, that is to say a periodic repetition of blocks within which the pixels are distributed pseudo-randomly.

Figures 3A, 3B:
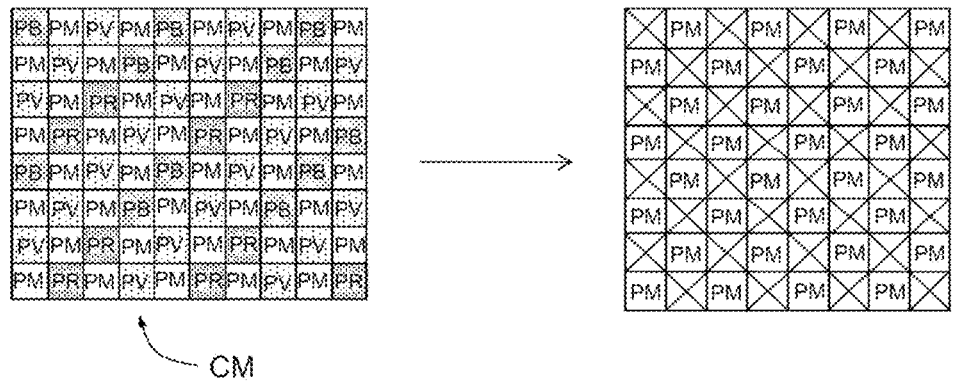

As an example, the left-hand part of FIG. 3A shows the pattern of a matrix sensor in which one pixel in two is of the panchromatic type (PM), one in four is green (PV), one in eight is red (PR) and one in eight is blue (PB). The fact that the green pixels are more numerous than the red or the blue in this example reflects the fact that the human eye exhibits a sensitivity peak for this color, but this proportion between green, blue and red pixels is not mandatory in the invention (it manages any other proportion existing between these different types of pixels).

It is also possible to use a sensor obtained by the regular repetition of a block of dimensions M×N containing a distribution of colored and panchromatic pixels that is pseudo-random (but with a controlled distribution between these different types of pixels).

For example, FIG. 3B shows a sensor pattern, called "1/16" ("1/N" meaning that one pixel in N is blue or red), for which there can be distinguished repeated patterns of 4×4 pixels, in which 12 pixels of panchromatic type, 1 pixel of red type, 1 pixel of blue type and 2 pixels of green type are distributed randomly. It will be well understood that several configurations of random distribution patterns are possible whether that be in FIG. 3A (sparse of "1/8" type) or 3B (sparse of "1/16" type). Some patterns can be chosen preferentially for their performance levels obtained on the output images with the processing operations which will be described later.

It is also possible to use more than three types of colored pixels, exhibiting different sensitivity bands, in order to obtain a plurality of monochromatic visible (and, if appropriate, in the near-infrared) images corresponding to these bands. It is thus possible to obtain hyperspectral images.

Moreover, it is not essential for the colored pixels (or all of them) to be sensitive to the near-infrared: it can be sufficient for the panchromatic pixels to be so.

Figure 2:
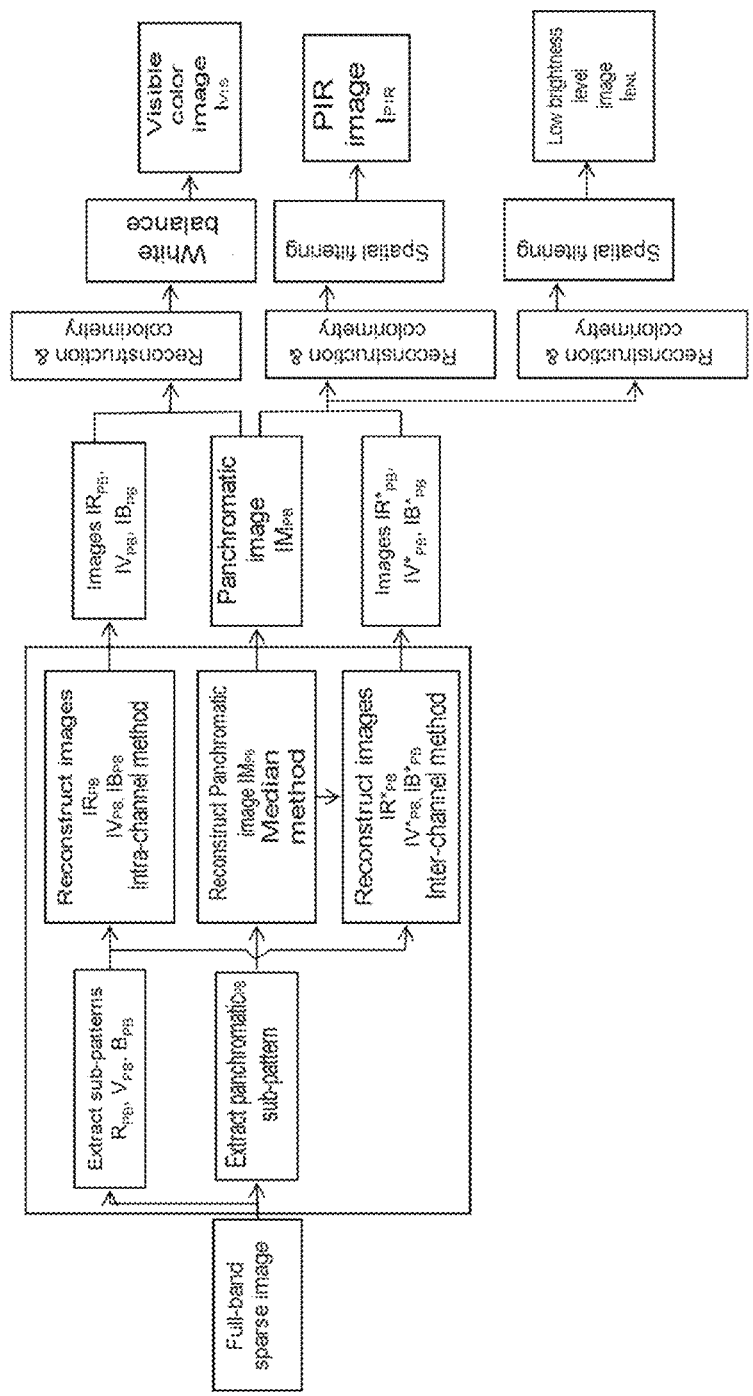
FIG. 2, a functional diagram of the processing implemented by the processor of the camera of FIG. 1A according to an embodiment of the invention.

FIG. 2 schematically illustrates the processing implemented by the processing circuit CTS. The various steps of this processing will be detailed later referring to FIGS. 3A to 6C.

The circuit CTS receives as input a set of digital signals representing the light intensity values detected by the different pixels of the matrix sensor CM. In the figure, this set of signals is designated by the expression "full-band sparse image". The first processing operation consists in extracting from this set the signals corresponding to the pixels of the different types. By considering the case of a regular arrangement of blocks of pixels M×N (M>1 and/or N>1), this can be called the extraction of the $R_{PB}$ (full-band red), $V_{PB}$ (full-band green), $B_{PB}$ (full-band blue) and $M_{PB}$ (full-band panchromatic) "patterns". These patterns correspond to downsampled images, or "to holes"; it is therefore necessary to proceed with reconstruction of complete images, sampled at the pitch of the matrix sensor.

The reconstruction of a full-band panchromatic image $IM_{PB}$ is the simplest operation, particularly when the panchromatic pixels are the most numerous. Such is the case in FIG. 3, where one pixel in two is panchromatic. The light intensity corresponding to the "missing" pixels (that is to say blue, green or red, and therefore not directly useable to reconstitute the panchromatic image) can be computed, for example by a simple bilinear interpolation. The method which has proven most effective is the so-called "medians" method: each "missing" pixel is assigned a light intensity value which is the median of the light intensity values measured by the panchromatic pixels constituting its closest neighbors.

The reconstruction of the full-band colored images (red, green, blue) is performed twice, by means of two different methods. A first method is called "intra-channel", because it uses only the colored pixels to reconstruct the colored images; a second method is called "inter-channel", because it uses also the information from the panchromatic pixels. Examples of such methods will be described later, referred to FIGS. 4A-4D (intra-channel) and 5 (inter-channel). Conventionally, only the intra-channel methods are used.

The full-band images, whether obtained by an intra-channel or inter-channel method are not directly usable, because they are "polluted" by the NIR (near-infrared) component not filtered by the optical system. This NIR component can be eliminated by combining the full-band images $IR_{PB}$, $IV_{PB}$, $IB_{PB}$ obtained by the intra-channel method with the full-band panchromatic image by means of a first colorimetry matrix (reference MCol1 in FIG. 6A). A visible image in colors $I_{VIS}$ is thus obtained, formed by three red, green and blue monochromatic sub-images IR, IV, IB, respectively.

The full-band images $IR^*_{PB}$, $IV^*_{PB}$, $IB^*_{PB}$ obtained by the inter-channel method are, also, combined with the full-band panchromatic image by means of a second colorimetry matrix (reference MCol2 in FIG. 6B). The elements of this matrix, serving as coefficients of the combination, are chosen to make it possible to obtain an image in the near-infrared $I_{PIR}$ (or, more specifically, a monochromatic image, generally in black and white, representative of the luminance of the image IO in the spectral band of the near-infrared).

Optionally, the combination of the full-band images $IR^*_{PB}$, $IV^*_{PB}$, $IB^*_{PB}$ obtained by the inter-channel method with the full-band panchromatic image by means of a third colorimetry matrix (reference MCol3 in FIG. 6C) makes it possible to obtain a monochromatic image $I_{BNL}$ representative of the luminance of the image IO in all the visible spectral band, but without pollution by the infrared components. Since it exploits the signals from the panchromatic sensors, more numerous and without filter, this image can be brighter than the image in colors $I_{VIS}$ and therefore be particularly suited to low-lighting conditions. It is important to note that the image $I_{BNL}$ does not contain any contribution in the near-infrared, which is thus digitally filtered. By contrast, the abovementioned article by D. Hertel et al., describes obtaining an image "with low light level" which combines images in the visible and in the near-infrared. Such an image is visually different from an image purely in the visible, like $I_{BNL}$.

In some cases, interest could be focused solely on the image in the near-infrared $I_{PIR}$ and possibly on the monochromatic visible image with low brightness $I_{BNL}$. In these cases, it would not be necessary to implement the intra-channel reconstruction method.

An advantageous image reconstruction method of "intra-channel" type will now be described referring to FIGS. 4A-4D. This description is given purely as an example because many other methods known in the literature (diffusion, wavelet, hue constancy and other such approaches) can be suited to the implementation of the invention.

In the matrix sensor of FIG. 3A, the blue pixels are grouped together in regular sub-patterns. The pattern MPB formed by these pixels can be broken down into two sub-patterns SMPB1, SMPB2 that are identical to one another but spatially offset; each of these sub-patterns has four blue pixels at the corners of a square of 5×5 pixels; that is illustrated in FIG. 4A. This method of breakdown into regular sub-patterns is applicable to the pixels of different types regardless of the random arrangement thereof defined in a block of M×N pixels. In particular, when the processing circuit CTS is produced by means of a dedicated digital circuit, it is advantageous to break down the pattern MPV into sub-patterns which can be processed in parallel.

FIG. 4B illustrates a case where the pattern of green pixels is broken down into four sub-patterns SMPV1, SMPV2, SMPV3 and SMPV4. The complete green monochromatic images, $IV_{PB}^1$, $IV_{PB}^2$, $IV_{PB}^3$, $IV_{PB}^4$, are obtained by bilinear interpolation of these sub-patterns. Then, a "full-band" green monochromatic image $IV^{PB}$ is obtained by averaging them.

The reconstruction of the full-band red and blue images is a little more complex. It is based on a method similar to "hue constancy" described in U.S. Pat. No. 4,642,678.

Firstly, the full-band green image $IV^{PB}$ is subtracted from the patterns of red and blue pixels. More specifically, that means that a value representative of the intensity of the corresponding pixel of the full-band green image $IV^{PB}$ is subtracted from the signal derived from each red or blue pixel. The pattern of red pixels is broken down into two sub-patterns SMPR1, SMPR2; after subtraction, the modified sub-patterns SMPR1', SMPR2'; are obtained; likewise, the pattern of blue pixels is broken down into two sub-patterns SMPB1, SMPB2; after subtraction, the modified sub-patterns SMPB1', SMPB2' are obtained. That is illustrated in FIG. 4C.

Figure 4D:
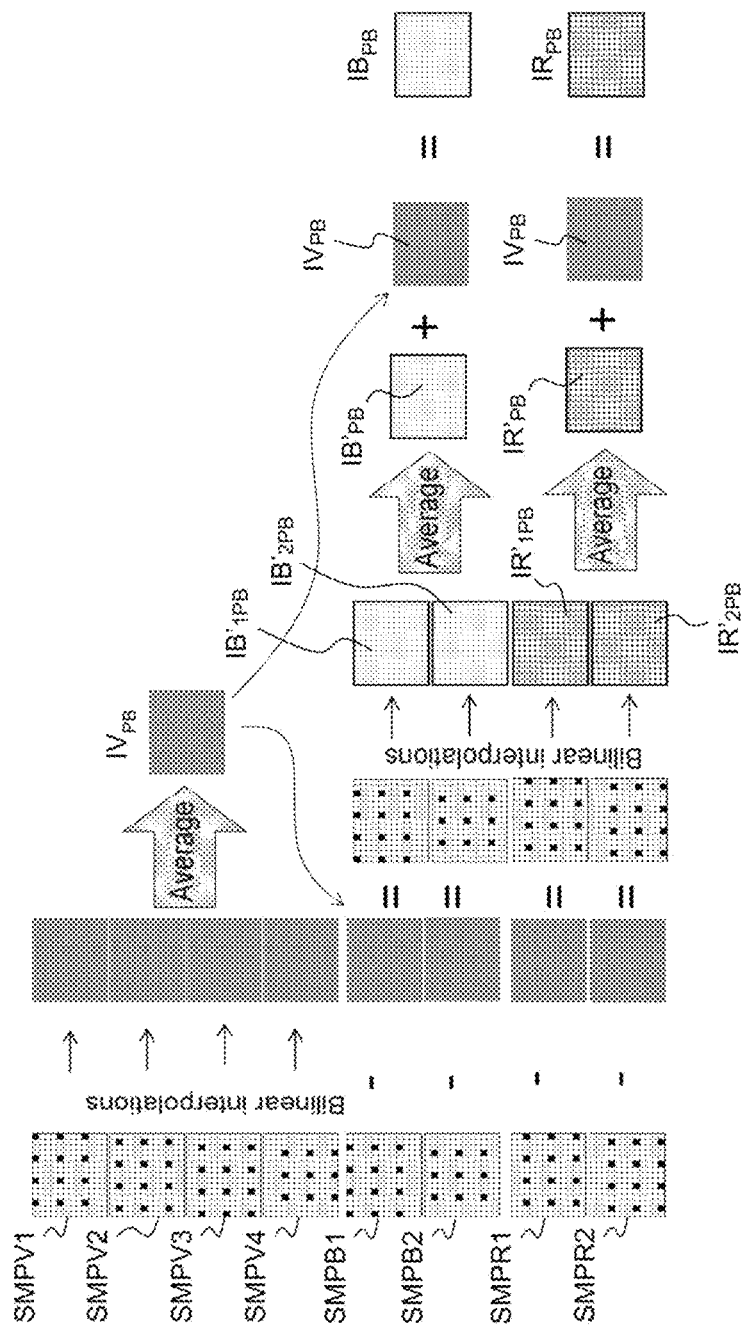

Next, as illustrated in FIG. 4D, images $IR1'_{PB}$, $IR2'_{PB}$ are obtained by bilinear interpolation of the red sub-patterns, and averaged to supply a modified red image $IR_{PB}'$. Likewise, images $IB1'_{PB}$, $IB2'_{PB}$ are obtained by bilinear interpolation of the red sub-patterns, and averaged to supply a modified blue image $IB_{PB}'$.

The full-band red image $IR_{PB}$ and the full-band blue image $IB_{PB}$ are obtained by adding the full-band green image $IV_{PB}$ to the modified red and blue images $IR_{PB}'$, $IB_{PB}'$.

The benefit of proceeding in this way, by subtracting the green image reconstructed from the patterns of red and blue pixels to add it at the end of the processing, is that the modified patterns exhibit a low intensity dynamic range, which makes it possible to reduce the interpolation errors. The problem is less acute for the green, which is sampled more finely.

The inter-channel reconstruction is performed differently. It explicitly exploits the panchromatic pixels, contrary to the intra-channel reconstruction which exploits only the red, green, blue pixels. As an example, it can be performed by means of an algorithm that can be qualified as "monochrome law", which is illustrated using FIGS. 5A and 5B. This idea on which this algorithm is based is that the colored components—green, red and blue—generally exhibit spatial variations which approximately "follow" those of the panchromatic component. It is therefore possible to use the panchromatic component, reconstituted by bilinear interpolation by benefiting from its denser spatial sampling, to compute the luminance level of the missing pixels of the colored components. More particularly, the luminance level of each colored pixel can be determined by application of a linear or affine function to the luminance of the corresponding pixel of the panchromatic image. The linear or affine function concerned is determined locally and depends on the luminance level of the close colored pixels already known (because measured directly or already computed).

Figures 5A, 5B:
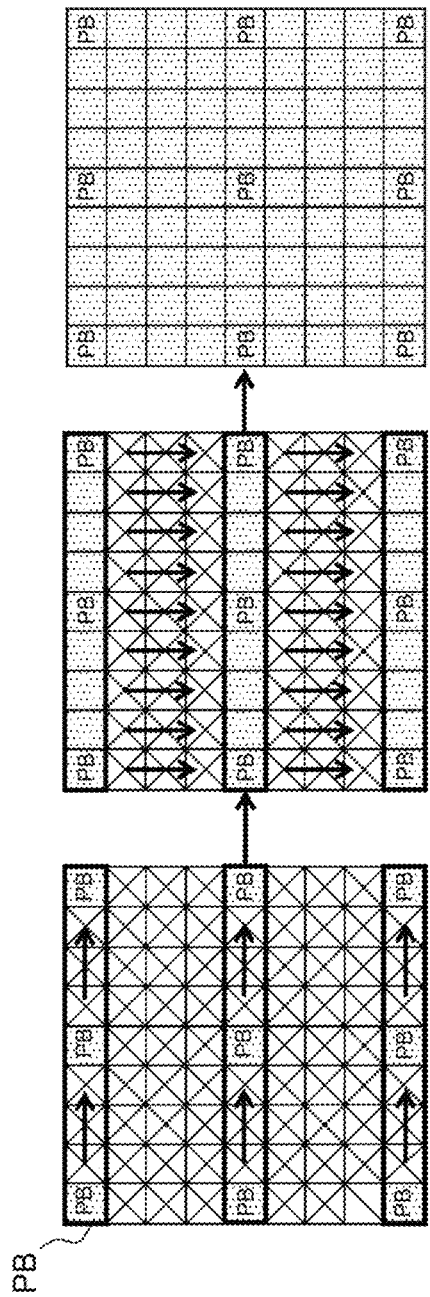

FIG. 5A relates to the case of a sparse sensor in which only one row in four contains blue pixels; within these rows, one pixel in four is blue. There is also a "full" panchromatic image, defined for all the pixels of the sensor, obtained as described above referring to FIG. 3. FIG. 5B shows a segment of the matrix sensor comprising two blue pixels separated by three pixels for which the blue component is not defined; superposed on this portion of row, there is a portion of panchromatic image, defined over all the pixels. $C_1$ and $C_5$ are used to designate the known luminances of the two blue pixels (more generally, colored) at the ends of the row segment, $C_2$, $C_3$ and $C_4$ designate the luminances—to be computed—of the blue component corresponding to three intermediate pixels, and $M_1$-$M_5$ designate the known luminances of the panchromatic image corresponding to these same pixels.

The first step of the method consists in reconstructing rows of the blue component of the image using the panchromatic image; only the rows containing the blue pixels are reconstructed in this way, i.e. one line in four. At the end of this step, there are complete blue rows, separated by rows in which the blue component is not defined. Looking at the columns, it will be noted that, in each column, one pixel in four is blue. It is therefore possible to reconstitute blue columns by interpolation assisted by the knowledge of the panchromatic image, as was done for the rows. The same process is applied for the green and red components.

The application of the monochrome law to reconstruct a colored component of the image proceeds in the following way.

Interest is focused on the pixels $M_1$ to $M_5$ of the reconstituted panchromatic image which are situated between two pixels $C_1$ and $C_5$ of the pattern of the color concerned, including the end pixels $M_1$, $M_5$ which are co-located with these two colored pixels. Then, a determination is made as to whether the corresponding portion of the panchromatic image can be considered uniform. To do this, the total variation of panchromatic luminance between $M_1$ and $M_5$ is compared to a threshold Th. If $|M_5-M_1|<Th$, then the zone is considered uniform, otherwise it is considered non-uniform.

If the zone of the panchromatic image is considered uniform, a check is carried out to see if the total panchromatic luminance $M_1+M_2+M_3+M_4+M_5$ is below a threshold, a function in particular of the thermal noise, in which case the panchromatic image does not contain usable information and the reconstruction of the colored component (more specifically: the computation of the luminance of the colored pixels $C_2$, $C_3$ and $C_4$) is done by linear interpolation between $C_1$ and $C_5$. In other words, a step-by-step reconstruction is carried out:

$$C_2 = C_1 \cdot \frac{M_2}{M_1}; C_3 = C_2 \cdot \frac{M_3}{M_2}; C_4 = C_3 \cdot \frac{M_3}{M_2}$$

In other words, the luminance of each colored pixel to be reconstructed is determined from that of the immediately preceding colored pixel, in the order of reconstruction, by applying to it the local variation rate measured on the panchromatic image.

If the luminance has to be an integer value, the computed result is rounded.

If the zone of the panchromatic image is not considered uniform ($|M_5-M_1|\geq Th$), then it is possible to directly reconstruct the colored pixels $C_2$-$C_4$ by application of a "monochrome law", that is to say the affine function expressing $C_i$ as a function of $M_i$ (i=1-5) and such that the computed values of $C_1$ and $C_5$ coincide with the measured values:

$$C_i = m \cdot M_i + p$$

with $$m = \left| \frac{C_5 - C_1}{M_5 - M_1} \right| \text{ and}$$

$$p = C_1 - m \cdot M_1$$

Thereagain, if the luminance has to be an integer value, the computed result is rounded.

The reconstruction by direct application of the monochrome law can lead to an excessively great dynamic range of the reconstructed colored component, or else to the saturation thereof. In this case, it may be worthwhile to revert to a step-by-step reconstruction. For example, an excessively great dynamic range condition can be observed when $$\frac{\max(M_i)}{\min(M_i)} + Th1 < \frac{\max(C_i)}{\min(C_i)}$$

where Th1 is a threshold, generally different from Th.

A saturation can be observed if $\min(C_i)<0$ or if $\text{Max}(C_i)$ is greater than a maximum allowable value (65535 considering the case of a luminance expressed by an integer number coded on 16 bits).

Obviously, the configuration of the FIGS. 5A and 5B—which involves a reconstruction of the colored components by segments of 5 pixels—is given only by way of example and the generalization of the method to other configurations does not pose any significant difficulty.

Variants of this method are possible. For example, another approach for determining the luminance of the colored pixels by using both close colored pixels (situated at a certain distance dependent on the pattern of the colored pixels concerned) and of the reconstituted neighboring panchromatic pixels, consist in using non-linear functions which approximate the distribution of the colored pixels by using, for example, a polynomial approximation (and more generally an approximation of a nonlinear spatial surface function) of the neighboring panchromatic pixels. The advantage of these mono-axis non-linear functions, or on the contrary surface bi-axis non-linear functions, is that they take account of the distribution of the colored pixels on a larger scale than the colored pixels closest to the pixel that is to be reconstructed. Within this framework of ideas, it is also possible to use more general value diffusion functions which exploit local gradients and abrupt jumps appearing in the luminance value of the panchromatic pixels. Whatever the method used, the principle remains the same: exploit the panchromatic pixels which are more numerous than the colored pixels, and the law of variation thereof to reconstruct the colored pixels.

Although the monochrome law method involves an approach with two successive mono-axis passes, the use of surface functions or of the diffusion equations makes it possible to proceed through a single-mass approach to reconstruct the colored pixels.

At this stage of the processing, there are a full-band panchromatic image, $IM_{PB}$, and two sets of three full-band monochromatic images ($IR_{PB}$, $IV_{PB}$, $IB_{PB}$) and ($IR^*_{PB}$, $IV^*_{PB}$, $IB^*_{PB}$). As described above, none of these images is directly usable, However, a color image in visible light $I_{VIS}$ can be obtained by combining the full-band images of the first set ($IR_{PB}$, $IV_{PB}$, $IB_{PB}$) and the full-band panchromatic image $IM_{PB}$ via a 3×4 colorimetry matrix, MCol1. More specifically, the red component IR of the visible image $I_{VIS}$ is given by a linear combination of $IR_{PB}$, $IV_{PB}$, $IB_{PB}$ and $IM_{PB}$ with coefficients $a_{11}$, $a_{12}$, $a_{13}$ and $a_{14}$. Similarly, the green component IV is given by a linear combination of $IR_{PB}$, $IV_{PB}$, $IB_{PB}$ and $IM_{PB}$ with coefficients $a_{21}$, $a_{22}$, $a_{23}$ and $a_{24}$, and the blue component IB is given by a linear combination of $IM_{PB}$, $IV_{PB}$, $IB_{PB}$ and $IR_{PB}$ with coefficients $a_{31}$, $a_{32}$, $a_{33}$ and $a_{34}$. That is illustrated by FIG. 6A.

Next, the visible image $I_{VIS}$ can be enhanced by a conventional white balance operation, to take account of the difference in lighting of the scene relative to that used to establish the coefficients of the colorimetry matrix.

Likewise, an image in the near-infrared $I_{PIR}$ can be obtained by combining the full-band images of the second set ($IR^*_{PB}$, $IV^*_{PB}$, $IB^*_{PB}$) and the full-band panchromatic image $IM_{PB}$ via a second 1×4 colorimetry matrix, MCol2. In other words, the image in the near-infrared $I_{PIR}$ is given by a linear combination of $IV^*_{PB}$, $IB^*_{PB}$, $IR^*_{PB}$ and $IR_{PB}$ with coefficients $a_{41}$, $a_{42}$, $a_{43}$ and $a_{44}$. That is illustrated by FIG. 6B.

If several types of pixels exhibit different spectral sensitivities in the near-infrared, it is possible to obtain a plurality of images in the near-infrared that are different, corresponding to $N_{PIR}$ different spectral sub-bands (with $N_{PIR}>1$). In this case, the second colorimetry matrix MCol2 becomes an $N_{PIR}\times(N_{PIR}+3)$ matrix, $N_{PIR}$ being the number of images in the near-infrared that are to be obtained. The case dealt with previously is the particular case where $N_{PIR}=1$.

Next, the image in the near-infrared $I_{PIR}$ can be enhanced by a conventional spatial filtering operation. This operation can for example be an outline enhancement operation associated or not with an adaptive filtering of the noise (the possible outline enhancement techniques that can be cited include the operation consisting in passing a high-pass convolution filter over the image).

The matrices MCol1 and MCol2 are in fact sub-matrices of a same colorimetry matrix "A", of dimensions 4×4 in the particular case where $N_{PIR}=1$ and where there are three types of colored pixels, which is not used as such.

The size of the colorimetry matrices must be modified if the matrix sensors has more than three different types of colored pixels. As an example, as for the $N_{PIR}$ pixels having different spectral sensitivities in the infrared, there can be $N_{VIS}$ (with $N_{VIS}\geq 3$) types of pixels sensitive to different sub-bands in the visible in addition to the unfiltered panchromatic pixels. These $N_{VIS}$ types of pixels can moreover exhibit different spectral sensitivities in the near-infrared to allow the acquisition of $N_{PIR}$ PIR images. Assuming that there are no pixels sensitive only in the infrared, the colorimetry matrix Mcol1 is then of dimensions $3\times(N_{VIS}+1)$.

Figure 6C:
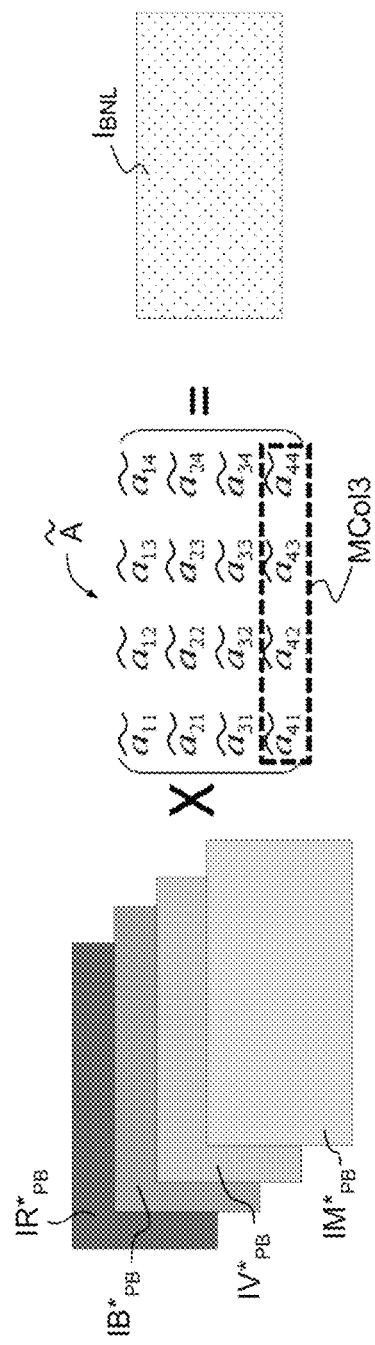

Moreover, the monochromatic visible image $I_{BNL}$ can be obtained by combining the full-band images of the second set ($IV^*_{PB}$, $IB^*_{PB}$, $IR^*_{PB}$) and the full-band panchromatic image $IM_{PB}$ via a second 1×4 colorimetry matrix, MCol3. In other words, the image $I_{BNL}$ is given by a linear combination of $IR^*_{PB}$, $IV^*_{PB}$, $IB^*_{PB}$ and $IM_{PB}$ with coefficients $\tilde{a}_{41}$, $\tilde{a}_{42}$, $\tilde{a}_{43}$, $\tilde{a}_{44}$ which form the last row of another 4×4 colorimetry matrix "$\tilde{A}$", which is also not used as such. That is illustrated by FIG. 6C.

The image $I_{BNL}$ can, in its turn, be enhanced by a conventional spatial filtering operation.

The colorimetry matrices A and $\tilde{A}$ can be obtained by a calibration method. The latter consists, for example, in using a pattern on which different paints reflecting in the visible and the NIR have been deposited, lighting the device by a controlled lighting and comparing the theoretical luminance values that these paints should have in the visible and the NIR with those measured, by using a 4×4 colorimetry matrix in which the coefficients are best adapted by a least square. The colorimetry matrix can also be enhanced by weighting the colors that are to be revealed as a priority or by adding measurements made on natural objects present in the scene. The proposed method (use of the NIR in addition to color, use of the 4×4 matrix, use of different paints emitting both in the visible and the NIR) differs from the conventional methods confined to the color, exploiting a 3×3 matrix and a conventional test pattern such as the "X-Rite checkerboard", or the Macbeth matrix.

Figure 7A:
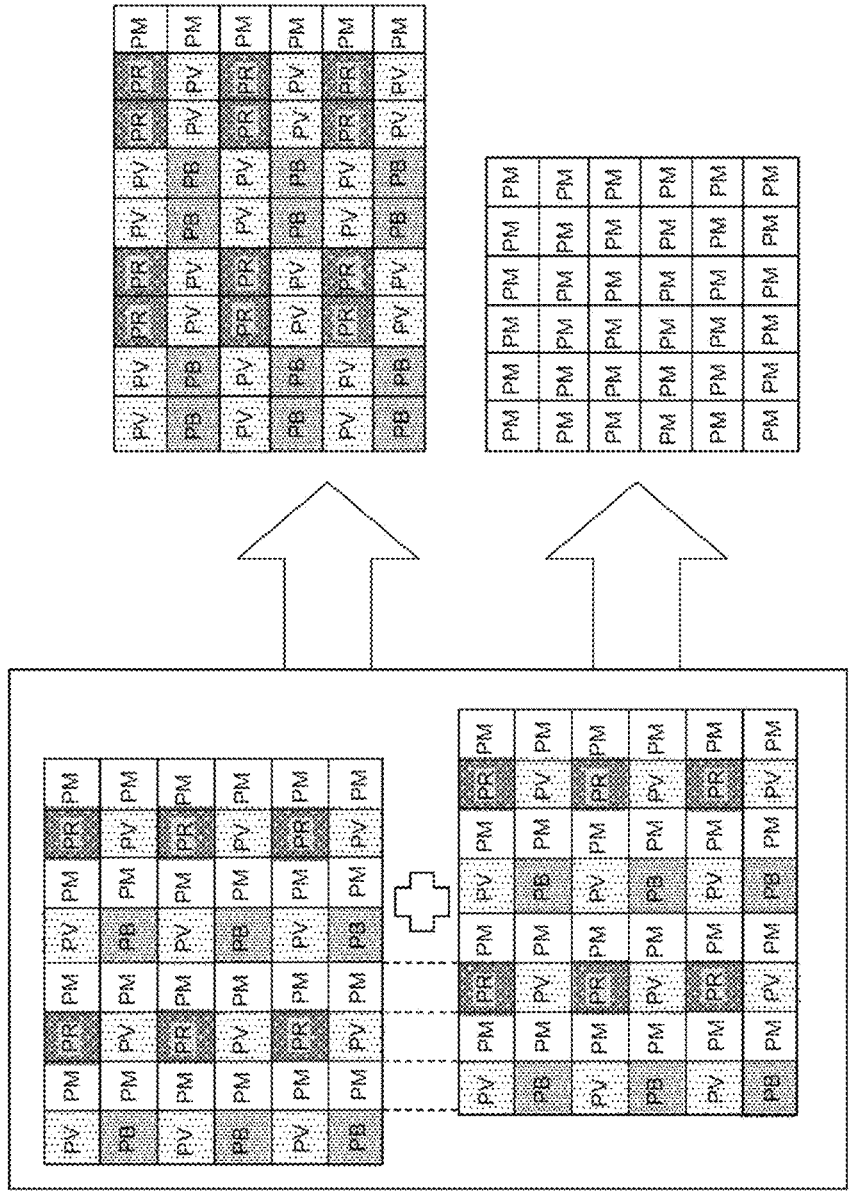
FIGS. 7A and 7B, two diagrams illustrating two variants of a processing implemented in a particular embodiment of the invention.
Figure 7B:
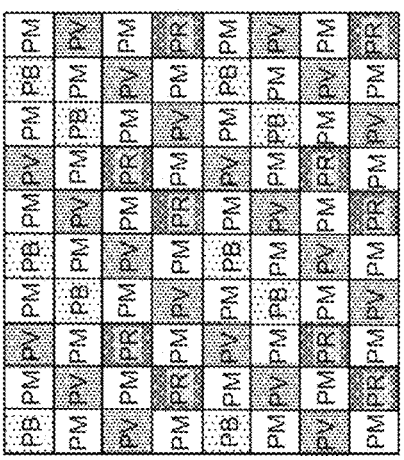
Figure 7B:
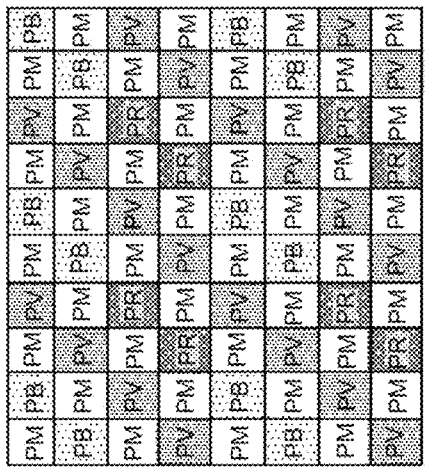

FIGS. 7A and 7B illustrate a possible enhancement of the invention, implementing a micro-scanning of the sensor. The micro-scanning consists in a periodic displacement (oscillation) of the matrix sensor in the image plane, or of the image relative to the sensor. This displacement can be obtained using a piezoelectric actuator or an actuator of direct current motor type, acting on the matrix sensor or on at least one image-forming optical element. Several (generally two) image acquisitions are performed during this displacement, which makes it possible to enhance the spatial sampling and therefore facilitate the reconstruction of the images. Obviously, that requires a higher acquisition rate than if the micro-scanning were not available.

In the example of FIG. 7A, the matrix sensor CM has a particular structure; one column in two is composed of panchromatic pixels PM, one in four, of an alternation of green PV and blue PB pixels, and one in four of an alternation of red PR and green PV pixels. The micro-scanning is performed by means of an oscillation of amplitude equal to the width of a pixel, in a direction at right angles to that of the columns. It can be seen that the space occupied by a "panchromatic" row when the sensor is located at an end of its displacement is occupied by a "colored" row when it is located at the opposite end, and vice versa. The image acquisition rate is higher than that performed without micro-scanning (for example at twice the frequency obtained without micro-scanning), so as to be able to add information to the images acquired without micro-scanning.

By taking the example of a double acquisition frequency, from two acquired images corresponding to two opposite extreme positions of the sensor (lefthand part of the FIG. 7A), it is possible to reconstruct (righthand part of the figure):

an image in color formed by the repetition of a pattern of four pixels—two greens arranged along a diagonal, one blue and one red (so-called "Bayer" matrix), formed by reconstructed pixels having an elongate form in the direction of the displacement with a form ratio of 2; and a "full" panchromatic image, directly usable without the need for interpolation;

these two reconstructed images being acquired at a rate two times lower than the acquisition frequency.

Indeed, the micro-scanning completes the panchromatic and colored pixel information, and the processing operations presented in the context of the present invention can directly be applied to the patterns generated from the detector before micro-scanning and from the additional patterns obtained after sub-scanning, so it is therefore not essential to use a specific pattern as presented in FIG. 7A, the latter however being able to be applied with simplified algorithms. Moreover, the micro-scanning can be performed on two axes and/or have an amplitude greater than the width of a pixel.

As an example, FIG. 7B illustrates the application of the micro-scanning to the sensor CM of FIG. 3A. In this example of sparse configuration, of 1/8 type, the micro-scanning involves the covering of all the panchromatic pixels, the addition of two blue sub-patterns, two red sub-patterns and four green sub-patterns which are superposed at the points previously panchromatic and which make it possible, in total, to apply the processing operations to two times more sub-patterns than initially. In more complex sparse configurations (1/N with N>=16), it is possible to generalize the micro-scanning to M positions in the two dimensions of the matrix simultaneously, and save a factor M on the number of sub-patterns.

Hitherto, only the case of a matrix sensor comprising exactly four types of pixels—red, green, blue and panchromatic—has been considered, but that is not an essential limitation. It is possible to use three types of colored pixels, even more, exhibiting sensitivity curves different from those illustrated in FIG. 1B. Furthermore, it is possible to use a fifth type of pixel, sensitive only to the radiation in the near-infrared. As an example, FIG. 8 represents a matrix sensor in which one pixel in four is panchromatic (reference PM), one pixel in four is sensitive only to the near-infrared (PI), one pixel in four is green (PV), one pixel in eight is red (PR) and one pixel in eight is blue (PB).

The signals from the pixels of the fifth type can be used in different ways. For example, it is possible to reconstruct, by the "intra-channel" method of FIGS. 4A-4D, an image in the near-infrared, designated for example by $I_{PIR}^D$ (the exponent "D" meaning that it is an image acquired "directly"), which can be averaged with the image $I_{PIR}$ obtained by application of the colorimetry matrix MCol2 to the images $IR_{PB}^*$, $IV_{PB}^*$, $IB_{PB}^*$ and $IM_{PB}$. It is also possible to use a colorimetry matrix MCol2 of dimensions 1×5 and to obtain the image in the near-infrared $I_{PIR}$ by a linear combination of $IR_{PB}^*$, $IV_{PB}^*$, $IB_{PB}^*$, $IM_{PB}$ and $I_{PIR}^D$ with matrix coefficients $a_{41}$, $a_{42}$, $a_{43}$, $a_{44}$ and $a_{45}$. The image $I_{PIR}^D$ can also be used to calibrate the colorimetry matrix MCol1 which then contains an additional column and becomes of size 3×($N_{VIS}$+2): each red, green, blue component reproduced is then expressed as a function of the $N_{VIS}$ planes reproduced in full-band, of the reconstructed panchromatic plane and of the PIR plane reconstructed from the pixels $I_{PIR}^D$.

Figures 8, 9A:
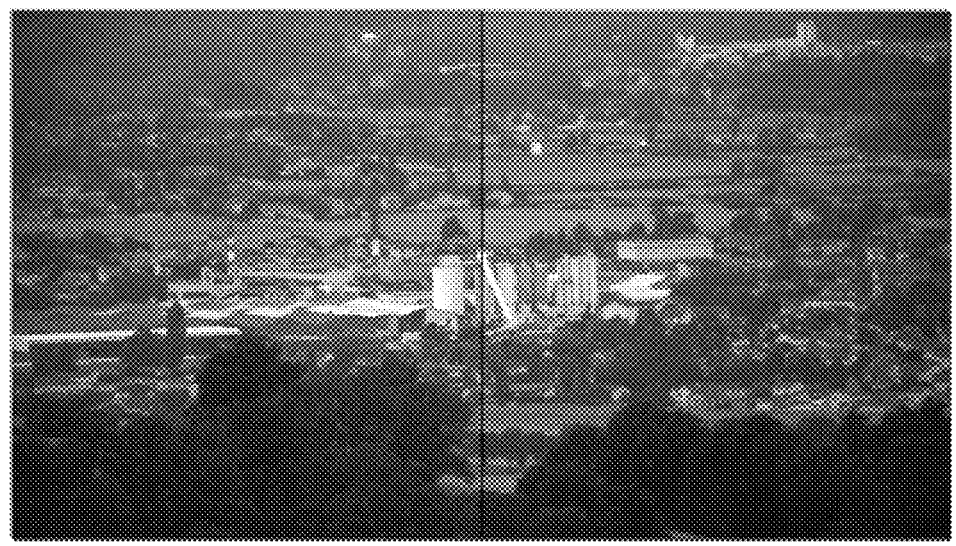
FIG. 8, a matrix sensor of an image acquisition system according to another variant of the invention.
FIGS. 9A and 9B, images illustrating technical results of the invention.

FIG. 9A is a composite image of a scene, observed in visible light. The lefthand part of the image, $I_{VIS}$, was obtained in accordance with the invention, by using the "sparse" matrix sensor of FIG. 3. The righthand part, $I'_{VIS}$, was obtained by a conventional method, using a non-sparse sensor. The quality of the two images is comparable.

Figure 9B:
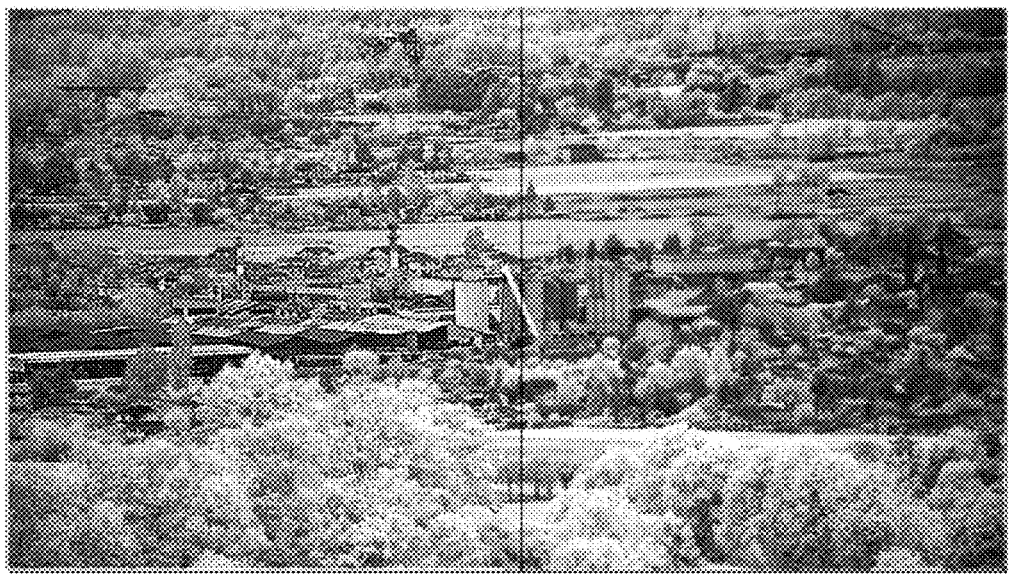

FIG. 9B is a composite image of the same scene, observed in the near-infrared. The lefthand part of the image, $I_{PIR}$, was obtained in accordance with the invention, by using the "sparse" matrix sensor of FIG. 3. The righthand part, $I'_{VIS}$, was obtained by using an NIR camera with a non-sparse sensor. The images are of comparable quality, but the image $I_{PIR}$ obtained in accordance with the invention is brighter by virtue of the use of a sparse sensor.

The invention claimed is:

1. An image acquisition system, comprising:
a matrix sensor comprising a two-dimensional arrangement of a plurality of pixels, each of said pixels being adapted to generate an electrical signal representative of light intensity at a point of an optical image of a scene; and
a signal processing circuit configured to process the electrical signal generated by each of said pixels to generate digital images of said scene;
wherein the plurality of pixels comprises colored pixels of first, second, and third types and panchromatic pixels;
wherein the colored pixels of the first type are sensitive to visible light in a first spectral band;
wherein the colored pixels of the second type are sensitive to visible light in a second spectral band different from the first spectral band; and
wherein the colored pixels of the third type are sensitive to visible light in a third spectral band different from the first and second spectral bands,
wherein a combination of the first, second, and third spectral bands reconstitutes all visible spectrum;
wherein the panchromatic pixels are sensitive to the visible spectrum and near-infrared; and
wherein said signal processing circuit is further configured to:
reconstruct a first set of monochromatic images from the electrical signals generated by the colored pixels of the first, second, and third types;
reconstruct a panchromatic image from the electrical signals generated by the panchromatic pixels;
reconstruct a second set of monochromatic images from the electrical signals generated by the colored pixels, and from said panchromatic image;

reconstruct a color image by application of a first colorimetry matrix to the monochromatic images of the first set and to said panchromatic image;

reconstruct at least one image in the near-infrared by application of a second colorimetry matrix at least to the monochromatic images of the second set and to said panchromatic image; and supply as output said color image and said at least one image in the near-infrared.

2. The image acquisition system as claimed in claim 1, wherein said colored pixels are further sensitive to the near-infrared, and wherein there are no other colored pixels in said image acquisition system.

3. The image acquisition system as claimed in claim 1, wherein the colored pixels of the first, second, and third types are sensitive to green light, blue light, and red light, respectively.

4. The image acquisition system as claimed in claim 1, wherein at least 25% of the plurality of pixels are panchromatic.

5. The image acquisition system as claimed in claim 1, wherein said signal processing circuit is further configured to reconstruct the monochromatic images of said first set by application of a method comprising the following steps:

determining the light intensity associated with said each colored pixel of said first type and reconstructing a first monochromatic image of said first set by interpolation;

determining the light intensity associated with said each colored pixel of the second and third types, and subtracting therefrom a value representative of an intensity associated with a corresponding pixel of said first monochromatic image; and reconstructing new monochromatic images by interpolation of light intensity values of the respective colored pixels of said second and third types, from which have been subtracted said values representative of the intensity associated with the corresponding pixel of said first monochromatic image, then combining these new reconstructed images with said first monochromatic image to obtain respective final monochromatic images of said first set.

6. The image acquisition system as claimed in claim 1, wherein said signal processing circuit is further configured to reconstruct said panchromatic image by interpolation of the electrical signals generated by the panchromatic pixels.

7. The image acquisition system as claimed in claim 1, wherein said signal processing circuit is further configured to reconstruct the monochromatic images of said second set by computing a luminance level of each pixel of each said image by application of a linear function, defined locally, to luminance of a corresponding pixel in the panchromatic image.

8. The image acquisition system as claimed in claim 1, wherein said signal processing circuit is further configured to reconstruct the monochromatic images of said second set by computing a luminance level of each pixel of each said image by means of a non-linear function of luminance levels of a plurality of pixels of the panchromatic image in a neighborhood of the pixel of said panchromatic image corresponding to said pixel of said image of the second set and/or of the light intensity of a plurality of colored pixels.

9. The image acquisition system as claimed in claim 1, wherein said matrix sensor is composed of a periodic repetition of blocks containing pseudo-random distributions of pixels of the different types and wherein said signal processing circuit is further configured to:

extract regular patterns of pixels of the same types from said matrix sensor; and reconstruct said first set and second set of monochromatic images by parallel processing of said regular patterns of pixels of the same types.

10. The image acquisition system as claimed in claim 1, wherein said signal processing circuit is further configured to reconstruct a monochromatic image with low brightness level by application of a third colorimetry matrix at least to the monochromatic images of the second set and to said panchromatic image.

11. The image acquisition system as claimed in claim 1, wherein said matrix sensor further comprises a two-dimensional arrangement of another plurality of pixels that are only sensitive to the near-infrared, and wherein said signal processing circuit is further configured to generate an image in the near-infrared using electrical signals generated by the other pixels.

12. The image acquisition system as claimed in claim 1, further comprising an actuator for producing a relative periodic displacement between the matrix sensor and the optical image, wherein the matrix sensor is adapted to reconstruct said first and second sets of monochromatic images and said panchromatic image from electrical signals generated by the pixels of the matrix sensor corresponding to a plurality of distinct relative positions of the matrix sensor and of the optical image.

13. The image acquisition system as claimed in claim 1, wherein said signal processing circuit is produced from a programmable logic circuit.

14. A visible-near-infrared bispectral camera comprising:
an image acquisition system as claimed in claim 1; and
an optical system adapted to form an optical image of a scene on a matrix sensor of such an image acquisition system, without filtering of near-infrared.

15. A method for simultaneous acquisition of images in color and in the near-infrared by use of a bispectral camera as claimed in claim 14.

16. The image acquisition system as claimed in claim 4, wherein at least 50% of the plurality of pixels are panchromatic.

* * * * *